United States Patent
Grams

(10) Patent No.: US 10,043,298 B2
(45) Date of Patent: Aug. 7, 2018

(54) ENHANCED DOCUMENT READABILITY ON DEVICES

(71) Applicant: Konica Minolta Laboratory U.S.A., Inc., San Mateo, CA (US)

(72) Inventor: Jason James Grams, Westminster, CO (US)

(73) Assignee: Konica Minolta Laboratory U.S.A., Inc., San Mateo, CA (US)

(*) Notice: Subject to any disclaimer, the term of this patent is extended or adjusted under 35 U.S.C. 154(b) by 51 days.

(21) Appl. No.: 14/502,663

(22) Filed: Sep. 30, 2014

(65) Prior Publication Data

US 2016/0093079 A1     Mar. 31, 2016

(51) Int. Cl.
    *G06T 11/60*     (2006.01)
    *G06T 11/00*     (2006.01)

(52) U.S. Cl.
    CPC ............ *G06T 11/60* (2013.01); *G06T 11/001* (2013.01)

(58) Field of Classification Search
None
See application file for complete search history.

(56) References Cited

U.S. PATENT DOCUMENTS

| | | | | |
|---|---|---|---|---|
| 6,429,950 B1* | 8/2002 | Ebner | ................. | G06K 15/02 358/1.16 |
| 7,184,063 B2* | 2/2007 | Shum | ................. | G06T 11/001 345/629 |
| 7,536,048 B2* | 5/2009 | Moravec | ................. | G06T 11/001 345/589 |
| 2001/0014175 A1* | 8/2001 | Tavor | ................. | G06T 11/001 382/167 |
| 2008/0066356 A1* | 3/2008 | Miller | ................. | G02B 6/0038 40/546 |
| 2010/0165378 A1 | 7/2010 | Fujimori | | |
| 2012/0127198 A1* | 5/2012 | Gundavarapu | ........ | G09G 5/026 345/629 |
| 2013/0021373 A1* | 1/2013 | Vaught | ................. | G02B 27/017 345/633 |
| 2013/0063486 A1* | 3/2013 | Braun | ................. | G09G 3/002 345/633 |
| 2015/0170606 A1* | 6/2015 | Jureidini | ................. | G09G 5/026 345/592 |

OTHER PUBLICATIONS https://en.wikipedia.org/wiki/Glyph as appearing on Jan. 23, 2016.*

* cited by examiner

*Primary Examiner* — Kumar Patel
*Assistant Examiner* — Richard M Russell
(74) *Attorney, Agent, or Firm* — Osha Liang LLP

(57) ABSTRACT

A method for operating a device having a screen, including: obtaining, by the device, a first background image of an environment behind the screen; obtaining, by the device, an electronic document (ED) having a text character with an initial text color; identifying, by the device, a pixel in the first background image associated with the text character; determining, by the device, a first final text color based on the initial text color and the pixel in the first background image; and displaying, by the device and on the screen, the ED with the text character in the first final text color.

12 Claims, 5 Drawing Sheets

ENHANCED DOCUMENT READABILITY ON DEVICES

BACKGROUND

Devices with transparent, or at least partially transparent, display screens are becoming increasing popular. This is especially true for devices that are mobile or even wearable. However, the environment behind the display screen can make it difficult to read text displayed on the screen. Specifically, the color of a displayed text character may be sufficiently close to the color of the environment behind the screen that reading the text becomes strenuous.

In addition, the environment behind the screen is unlikely to be static. Accordingly, the readability of displayed text may change over time. Any attempt to continuously change the displayed text based on the changing environment behind the screen is likely to frustrate the user. Regardless, users still desire to view text on transparent, or partially transparent, screens.

SUMMARY

In general, in one aspect, the invention relates to a method for operating a device comprising a screen. The method comprises: obtaining, by the device, a first background image of an environment behind the screen; obtaining, by the device, an electronic document (ED) comprising a text character with an initial text color; identifying, by the device, a pixel in the first background image associated with the text character; determining, by the device, a first final text color based on the initial text color and the pixel in the first background image; and displaying, by the device and on the screen, the ED with the text character in the first final text color.

In general, in one aspect, the invention relates to a non-transitory computer readable medium (CRM) storing instructions for operating a device comprising a screen. The instructions comprise functionality for: obtaining a first background image of an environment behind the screen; obtaining an electronic document (ED) comprising a text character with an initial text color; identifying a pixel in the first background image associated with the text character; determining a first final text color based on the initial text color and the pixel in the first background image; and displaying, on the screen of the device, the ED with the text character in the first final text color.

In general, in one aspect, the invention relates to a device. The device comprises: a screen; a buffer storing an electronic document (ED) comprising a text character with an initial text color; a camera configured to generate a first background image of an environment behind the screen, wherein the first background image comprises a first pixel corresponding to the text character; and a color module configured to determine a first final text color for the text character based on the first pixel and the initial text color, wherein the ED is displayed on the screen with the text character in the first final text color.

Other aspects of the invention will be apparent from the following description and the appended claims.

DETAILED DESCRIPTION

Figure 1:
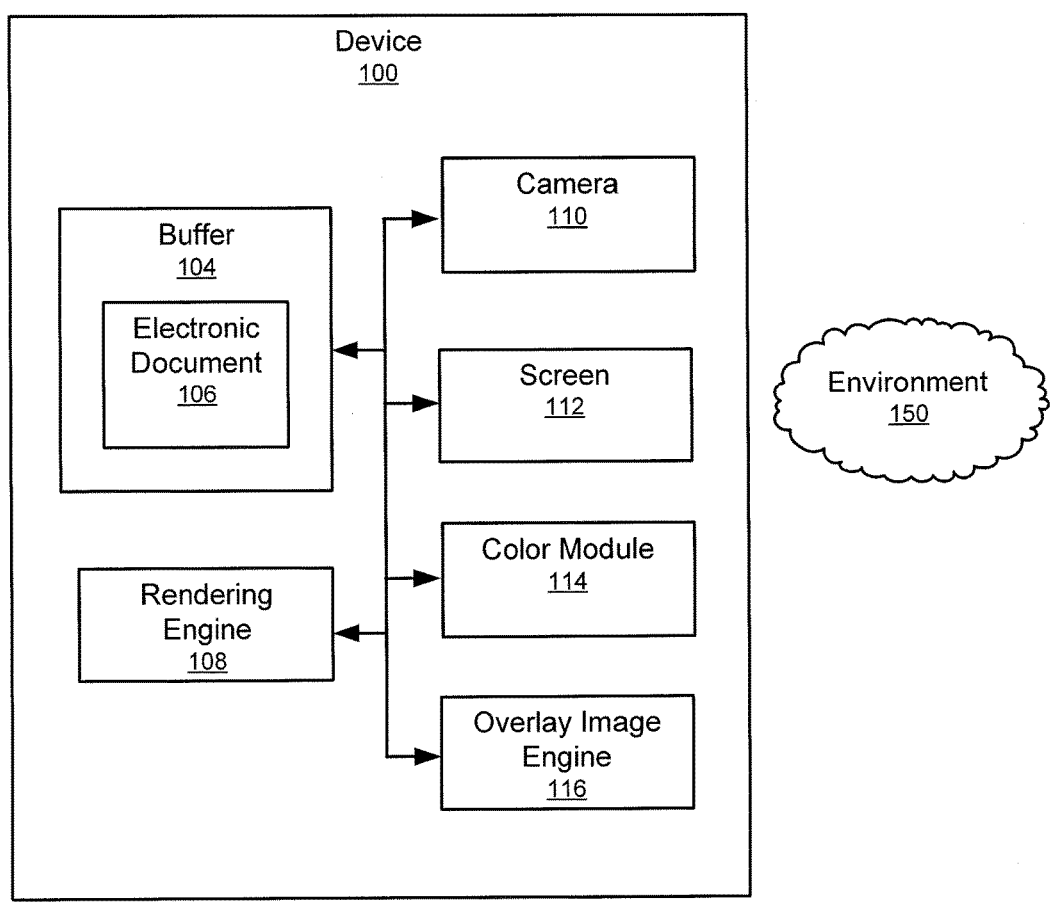
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a device comprising a screen, a method of operating a device comprising a screen, and a computer readable medium storing instructions for operating a device comprising a screen. Specifically, a background image of the environment behind the screen is obtained, and then pixels in the background image associated with text to be displayed are identified. A final text color is determined based on the color of the text specified in the electronic document (ED) and the pixels of the background image. The text appears on the screen in the final text color. At a future point, when a change in the environment has been detected, a new final text color is determined. The displayed text is transitioned from the final text color to the new final text color in stages (i.e., not immediately or suddenly).

FIG. 1 shows a device (100) in accordance with one or more embodiments of the invention. As shown in FIG. 1, the device (100) has multiple components including, for example, a buffer (104), a rendering engine (108), a camera (110), a screen (112), a color module (114), and an overlay image engine (116). Each of these components is discussed below. Moreover, the device (100) may be a mobile computer device (e.g., smart phone, tablet PC, laptop, e-reader, etc.) and/or a wearable computer device (e.g., a pair of glasses, a watch, etc.). In one or more embodiments, the device (100) is a stationary computer device (e.g., a desktop personal computer (PC), a kiosk, a server, a mainframe, a cable box, etc.).

In one or more embodiments of the invention, the device (100) includes a screen (112). The screen (112) may be transparent or at least partially transparent. Accordingly, a user viewing the screen (112) may also observe the environment (150) behind the screen. The screen (112) may be of any resolution and capable of displaying text, graphics, images, videos, animation, etc. in any color. In embodiments where the device (100) is a pair of glasses, the screen (112) is located within a lens or spread across both lenses of the pair of glasses. Although FIG. 1 shows the screen (112) as being part of the device (100), in one or more embodiments of the invention, the screen (112) is external to the device (100). For example, the screen (112) may be a desktop monitor or a television that is separate from the device (100).

In one or more embodiments of the invention, the device (100) includes a camera (110). The camera (110) is configured to generate background images of the environment (150) behind the screen (112). The camera (110) may periodically generate background images of the environment (150). Additionally or alternatively, the camera (110) may generate a background image of the environment (150) in response to a change in the environment (150) being detected. In embodiments where the device (100) is a pair of glasses, the camera (100) is attached to the pair of glasses. For example, the camera (110) may be located within the frame of the pair of glasses or mounted on the frame. In other embodiments, the camera (110) may be mounted on an edge of the screen (112) or located within the screen (112). In one or more embodiments of the invention, the device (100) includes an accelerometer (not shown) used to detect the device (100) is in motion and thus the environment (150) is likely changing.

In one or more embodiments of the invention, the device (100) includes a buffer (104). The buffer (104) may be of any size and may be composed of any type of memory or long-term storage (e.g., hard drive). As shown in FIG. 1, the buffer (104) holds/stores an electronic document (ED) (106) requested by the user for viewing. The ED (106) may include one or more text characters, graphics, images, etc. to be displayed. The ED (106) may also specify one or more text colors for the one or more text characters. Examples of the ED (106) include web pages (e.g., hypertext markup language (HTML) files), portable document format (PDF) files, Open Office XML (OOXML) files or files generated using any markup language, slide show presentations, spreadsheets, etc.

In one or more embodiments of the invention, the device (100) includes a rendering engine (108). The rendering engine (108) is configured to generate a rendered version of the ED (106) based on, for example, the one or more text characters and the one or more text colors specified in the ED (106). Generating the rendered version of the ED (106) may include calculating the positions (e.g., coordinates) of each text character, image, graphic, etc. in the ED (106) based on any formatting attributes (e.g., line spacing, margins, paragraph spacing, borders, etc.) specified in the ED (106). In one or more embodiments of the invention, the rendered version of the ED (106) is a set of pixels suitable for display on the screen (112). When viewed together, this set pixels forms the text characters, images, graphics, etc. of the ED (106). Further, those pixels corresponding to the text characters, are colored according to the text color specified in the ED (106).

In one or more embodiments of the invention, the rendering engine (108) is configured to generate/output a text tag bit (TTB) plane. The TTB plane is a grid of cells, with each cell corresponding to one of the pixels in the rendered version of the ED (106). Each cell stores a value that is dependent on the cell's corresponding pixel. For example, if a pixel in the rendered ED is part of a text character, the cell corresponding to the pixel may have the binary value "01". If a pixel in the rendered ED is part of an image, the cell corresponding to the pixel may have the binary value "10".

In one or more embodiments of the invention, the device (100) includes an overlay image engine (116). The overlay image engine (116) is configured to determine the pixels in the background image (e.g., generated by the camera (110)) that are associated with the text characters of the ED (106). Specifically, the overlay image engine (116) may apply the TTB plane to the background image to identify the pixels in the background image that are associated with the text characters in the ED (106). Only the pixels of the background image that overlap/intersect cells of the TTB plane denoting text characters are deemed to be associated with text characters.

In one or more embodiments of the invention, the overlay image engine (116) is configured to generate an overlay image. The overlay image may be generated by making all pixels in the background image that are not associated with text characters transparent. Generating the overlay image may also include setting the pixels in the background image that are associated with text characters to final text colors or intermediate text colors (discussed below). Once the overlay image is generated, it may be superimposed upon the rendered version of the ED (106) and displayed on the screen (112). As a result of the superposition, all of the text characters will appear in the final text colors or intermediate text colors instead of the text colors specified in the ED (106).

In one or more embodiments of the invention, the device (100) includes a color module (114). The color module (114) is configured to determine the final text color for each pixel in the background image that is associated with a text character. The final text color is effectively a color that will make the text character easier to read on the screen (112) in view of the environment behind the screen. The final text color may be determined in multiple ways. For example, the final text color may be based on a greyscale value of the pixel (or an average greyscale value of pixels within the vicinity of the pixel) and the text color specified by the ED (106) for the associated text character. As another example, the final text color may be determined based on a greyscale value of the pixel (or the average greyscale value of pixels within the vicinity of the pixel) and a darkness threshold. Intermediate text colors may be considered incremental steps between an initial text color and a final text color.

Although embodiments of the invention have been described with respect to superimposing an overlay image onto an existing rendered version of the ED, in one or more embodiments of the invention, the rendering engine (108) is configured to generate a rendered version of the ED (106) with the text characters already in the final text colors or intermediate text colors. In such embodiments, as a position for a text character is calculated, the corresponding pixel in the background image is identified. Then, the final text color or intermediate text color is determined before the ED is rendered, and applied to the glyph of the text character. As a result, the rendered ED already has the text characters in the final text colors or intermediate text colors. In such embodiments, the overlay image might not be required.

Figure 2:
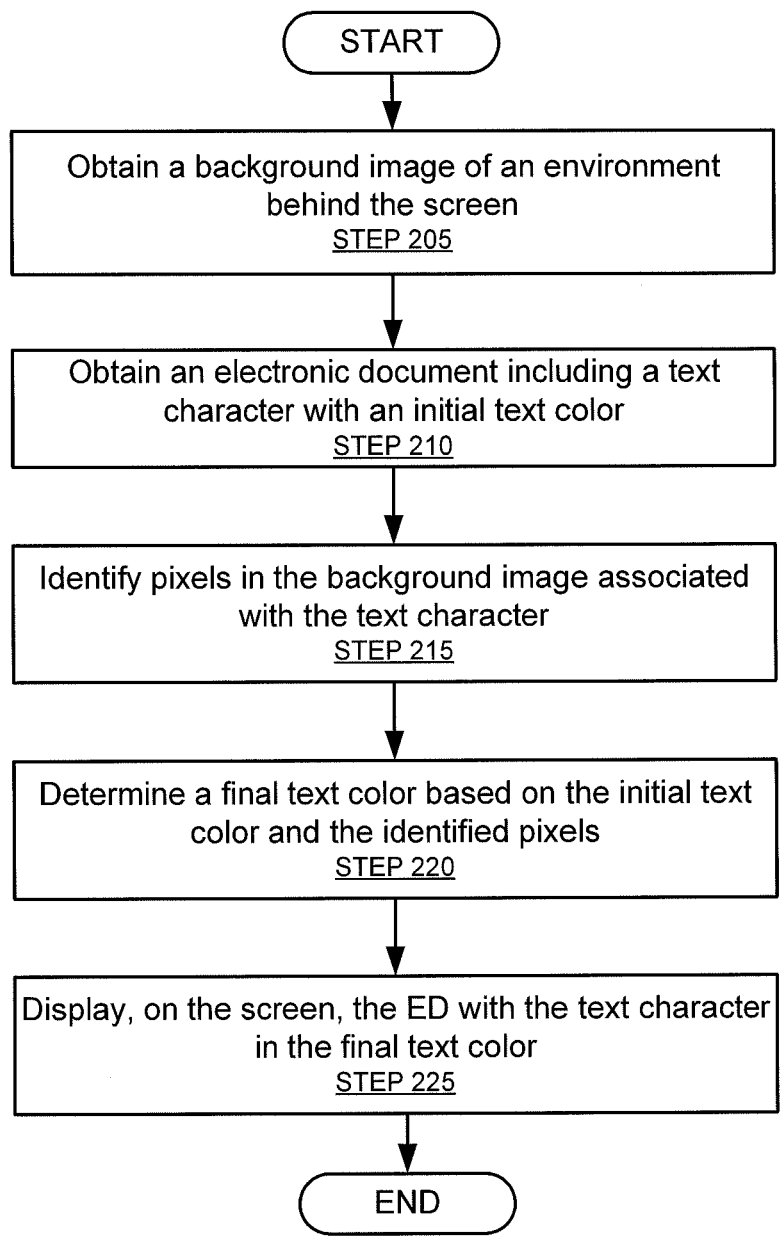
FIG. 2-4 show flowcharts in accordance with one or more embodiments of the invention.

FIG. 2 shows a flowchart in accordance with one or more embodiments of the invention. The flowchart depicts a process for operating a device comprising a screen. One or more of the steps in FIG. 2 may be performed by the components of the device (100), discussed above in reference to FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, a background image of an environment behind the screen is obtained (STEP 205). The screen may be transparent, or at least partially transparent, and thus the environment behind the screen may be visible to a user attempting to view the screen. The background image may be obtained by a camera that is attached to the device.

In STEP 210, an ED is obtained. The ED may specify one or more text characters to be displayed in one or more text colors ("initial text colors"). The ED may also include graphics, images, animation, videos, etc. Accordingly, the ED may correspond to web pages (e.g., hypertext markup language (HTML) files), portable document format (PDF) files, Open Office XML (OOXML) files or files generated using any markup language, slide show presentations, spreadsheets, etc.

In STEP 215, pixels in the background image associated with a text character in the ED are identified. STEP 215 is described in detail in FIG. 3.

In STEP 220, a final text color for the text character is determined. The final text color may be determined based on the initial text color, specified in the ED, for the text character and the pixels in the background image associated with the text character. The final text color is better suited than the initial text color for viewing the text character against the environment behind the screen. In other words, the final text color makes the text character easier to read when the environment behind the screen is considered. STEP 220 is described in detail in FIG. 3 STEP 215 and STEP 220 may be repeated for each text character in the ED.

In STEP 225, the ED is displayed, on the screen, with the text characters in their final text colors. The user can easily read the displayed text characters because the final text colors are sufficiently contrasted with the colors in the environment. STEP 225 is described in detail in FIG. 3

Figure 3:
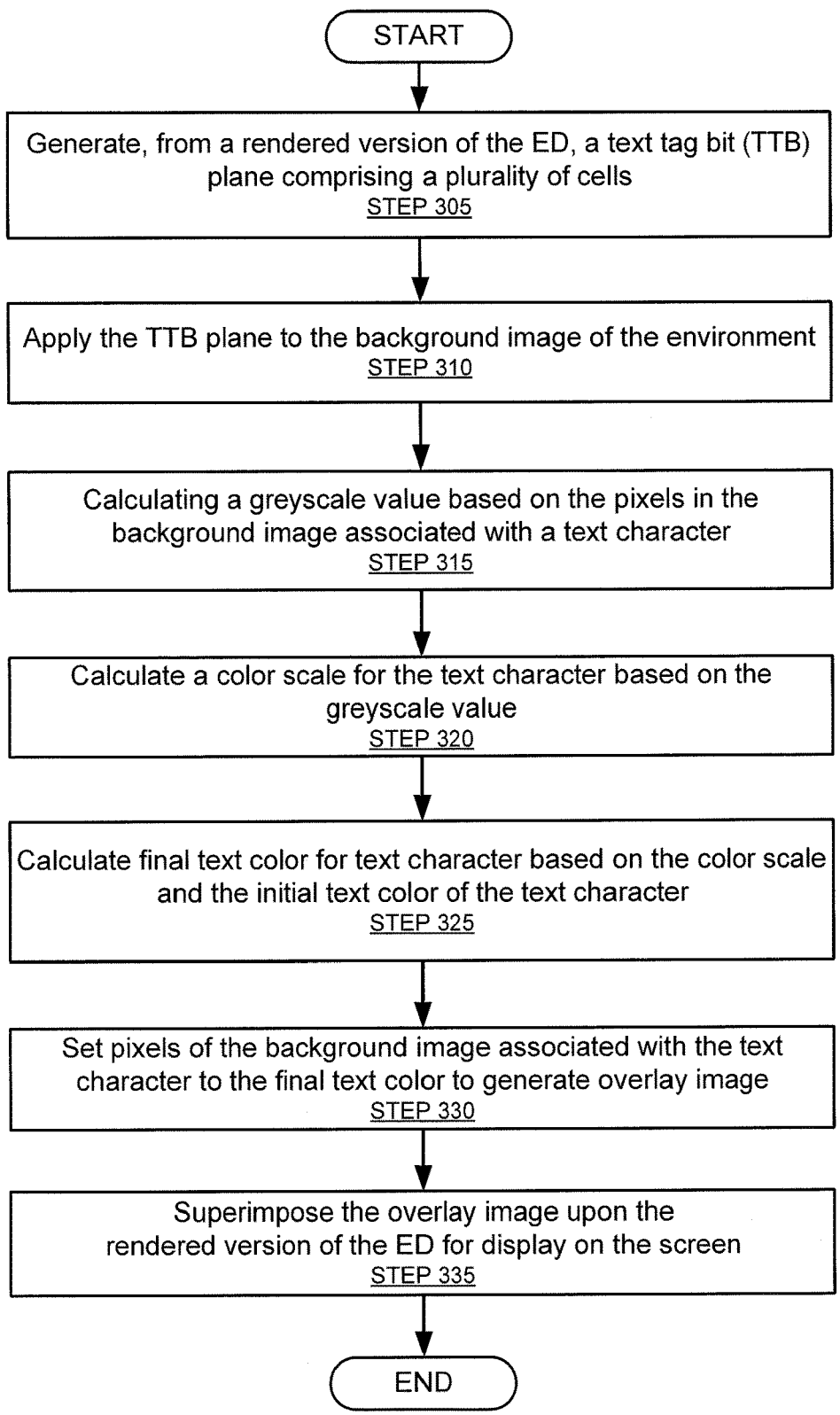

FIG. 3 shows a flowchart in accordance with one or more embodiments of the invention. Some steps in the flowchart of FIG. 3 further expand STEP 215, STEP 220, and/or STEP 225 in FIG. 2. One or more of the steps in FIG. 3 may be performed by the components of the device (100), discussed above in reference to FIG. 1. In one or more embodiments of the invention, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3.

Initially, a TTB plane is generated based on a rendered version of the ED. The TTB plane is a grid of cells, with each cell corresponding to one pixel in the rendered version of the ED. Further, each cell stores a value that depends on whether the corresponding pixel is part of a text character, an image, a graphic, etc. For example, if a pixel in the rendered ED is part of a text character, the cell in the TTB plane corresponding to the pixel may have the binary value "01". If a pixel in the rendered ED is part of an image, the cell in the TTB plane corresponding to the pixel may have the binary value "10".

In STEP 310, the TTB plane is applied to the background image (e.g., the background image in STEP 205). The TTB plane is applied to identify: (i) which pixels in the background image are associated with text characters in the ED; (ii) which pixels in the background image are associated with images in the ED; (iii) which pixels in the background image are associated with graphics in the ED, etc. Specifically, pixels in the background image that intersect/overlap with cells denoted as text characters are deemed to be associated with text characters. Similarly, pixels in the background image that intersect/overlap with cells denoted as graphics are deemed to be associated with graphics, etc. In another example and alternatively, pixels in the background image that surround the cells denoted as text characters are deemed to be associated with text characters.

In STEP 315, a greyscale value is calculated based on the pixels in the background image associated with a text character. In one or more embodiments of the invention, the greyscale value ($K_P$) of a pixel in the background image having a red component ($R_P$), a green component ($G_P$), and blue component ($B_P$) is calculated as:

$$K_P = R_P*0.3 + G_P*0.59 + B_P*0.11$$

This calculation may be performed for each pixel in a set of pixels in the background image associated with the text character. For example, the set of pixels may correspond to the pixels within a rectangular (or other shaped) region of the background image that enclose/surround the text character, that enclose/surround a word that has the text character, that enclose/surround a sentence or paragraph that includes the text character. These multiple greyscale values of the multiple pixels may then be averaged. Those skilled in the art, having the benefit of this detailed description, will appreciate that other algorithms may be used to calculate a greyscale value.

Those skilled in the art, having the benefit of this detailed description, will appreciate that the final text color for a given pixel is calculated to maximize contrast with the environment behind the screen. The W3C recommends a contrast in gray values between a foreground and background image to be at least 125.

In one or more embodiments of the invention, if the greyscale value is greater than a darkness threshold (e.g., 127), the target overlay color is deemed to be black. In one or more embodiments of the invention, if the greyscale value is less than or equal to the darkness threshold, the target overlay color is deemed to be white. Using either black or white guarantees that pixel contrast will be at least 125.

In STEP 320, a color scale ($C_S$) is calculated based on the greyscale value ($K_P$). The color scale may be calculated as:

$$C_S = |(K_P - 125)/255|$$

In STEP 325, a final text color is calculated based on the color scale and the initial text color for the text character (i.e., the text color specified in the ED). Let $R_D$, $G_D$, and $B_D$ represent the red component, the green component, and the blue component, respectively, of the initial text color for the text character. The unscaled red ($R_U$) channel, unscaled green ($G_U$) channel, and unscaled blue ($B_U$) channel of the final text color are calculated as:

$$R_U = R_D - \mathrm{MIN}(R_D, G_D, B_D)$$

$$G_U = G_D - \mathrm{MIN}(R_D, G_D, B_D)$$

$$B_U = B_D - \mathrm{MIN}(R_D, G_D, B_D)$$

The calculation of the final text color may also depend on whether the target overlay color was deemed to be black or white (discussed above in reference to STEP 315). If the target overlay color was deemed to be black, the final text color ($R_S$, $G_S$, $B_S$) is calculated as:

$$R_S = C_S * R_U$$

$$G_S = C_S * G_U$$

$$B_S = C_S * B_U$$

If the target overlay color was deemed to be white, the final text color ($R_S$, $G_S$, $B_S$) is calculated as:

$$R_S = 255 - (C_S * R_U)$$

$$G_S = 255 - (C_S * G_U)$$

$$B_S = 255 - (C_S * B_U)$$

In one or more embodiments of the invention, STEP 325 is optional. In such embodiments, the final text color is the target overlay color determined as part of STEP 320. However, by using the final text color calculated in STEP 325, some color differences (i.e., differences between different colors specified in the ED) will be retained.

In STEP 330, pixels in the background image associated with the text character are set to the final text color. STEP 315, STEP 320, STEP 325, and STEP 330 may be performed for each text character in the ED. Further, all pixels in the background image that are not associated with a text character may be made transparent. STEP 330 effectively transforms the background image into an overlay image.

In STEP 335, the overlay image is superimposed upon the rendered version of the ED, and the superimposed image is displayed on the screen. All the text characters in the ED appear in their respective final text colors. Further, the graphics and images of the ED are viewed and unaffected by the overlay image.

Figure 4:
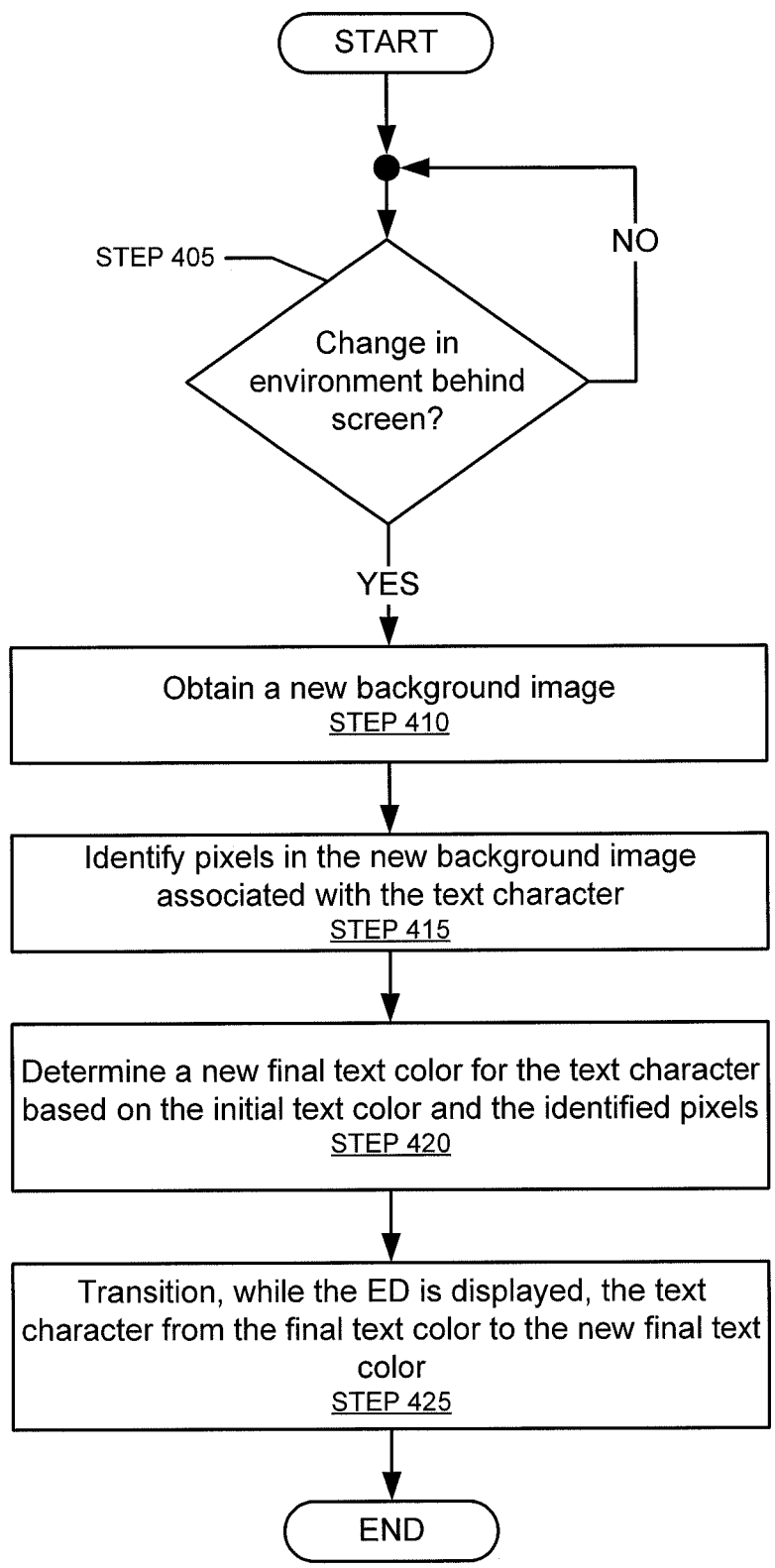

FIG. 4 shows a flowchart in accordance with one or more embodiments of the invention. In one or more embodiments of the invention, the process in FIG. 4 takes place after the ED is displayed, for some predetermined time, with the text characters in the final text color(s). One or more of the steps in FIG. 4 may be performed by the components of the device (100), discussed above in reference to FIG. 1. In one or more embodiments of the invention, one or more of the steps shown in FIG. 4 may be omitted, repeated, and/or performed in a different order than the order shown in FIG. 4. Accordingly, the scope of the invention should not be considered limited to the specific arrangement of steps shown in FIG. 4.

Initially, it is determined whether there has been a change in the environment behind the screen (STEP 405). For example, if the user is moving (as detected by an accelerometer), it is highly likely there has been a change in the environment behind the screen. When it is determined that the environment has changed, the process proceeds to STEP 410.

In STEP 410, a new background image is obtained. STEP 410 is essentially the same as STEP 205, discussed above in FIG. 2

In STEP 415, pixels in the background image associated with a text character in the ED are identified. STEP 415 is essentially the same as STEP 215, discussed above in reference to FIG. 2.

In STEP 420, a new final text color for the text character is determined based on the new background image and the initial text color for the text character. STEP 420 is essentially the same as STEP 220 discussed above in reference to FIG. 2 STEP 415 and STEP 420 may be performed for all text characters in the ED.

In STEP 425, each displayed text character is transitioned from its final text color to its new final text color over multiple stages. Specifically, each text character is displayed in various intermediate colors until reaching its new final text color. For a given text character, let $R_F$, $G_F$, and $B_F$ be the red component, the green component, and the blue component, respectively, of the final text color. This is the color the user is currently viewing on the screen. Let $R_{NF}$, $G_{NF}$, and $B_{NF}$ be the red component, the green component, and the blue component, respectively, of the new final text color. An intermediate text color ($R_I$, $G_I$, $B_I$) for the text character may be calculated as:

$$R_I = R_F + (I*(R_{NF} - R_F)/T)$$

$$G_I = G_F + (I*(G_{NF} - G_F)/T)$$

$$B_I = B_F + (I*(B_{NF} - B_F)/T)$$

T is the total number of stages. Therefore, $1 \leq I \leq T$. The timing between stages must be slow enough not to frustrate the user. In fact, the timing between stages may be a user preference. At each stage, the pixels in the overlay image are updated/set to the appropriate intermediate text color. As a result, the superimposed image now displays the text characters in the intermediate text color(s). Eventually, once the final stage is reached, the superimposed image will have each text character in its new final text color.

The disclosed embodiments have focused primary on the use of an overlay image to achieve the intermediate text colors. In one or more embodiments of the invention, the rendering engine (108) is configured to re-render the ED (106) for each stage of the transition. Such embodiments require determining the intermediate text color before the ED is re-rendered because the intermediate text color is applied to the glyph of the text character(s) during the rendering. One potential benefit of such embodiments is that no overlay image or TTB plane is needed.

Figure 5:
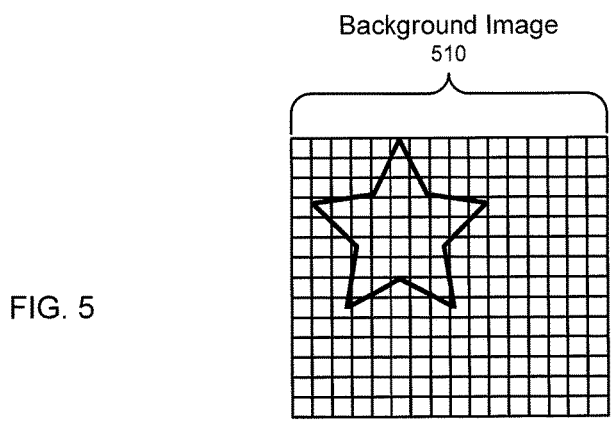
FIG. 5 shows an example in accordance with one or more embodiments of the invention.
Figure 5:
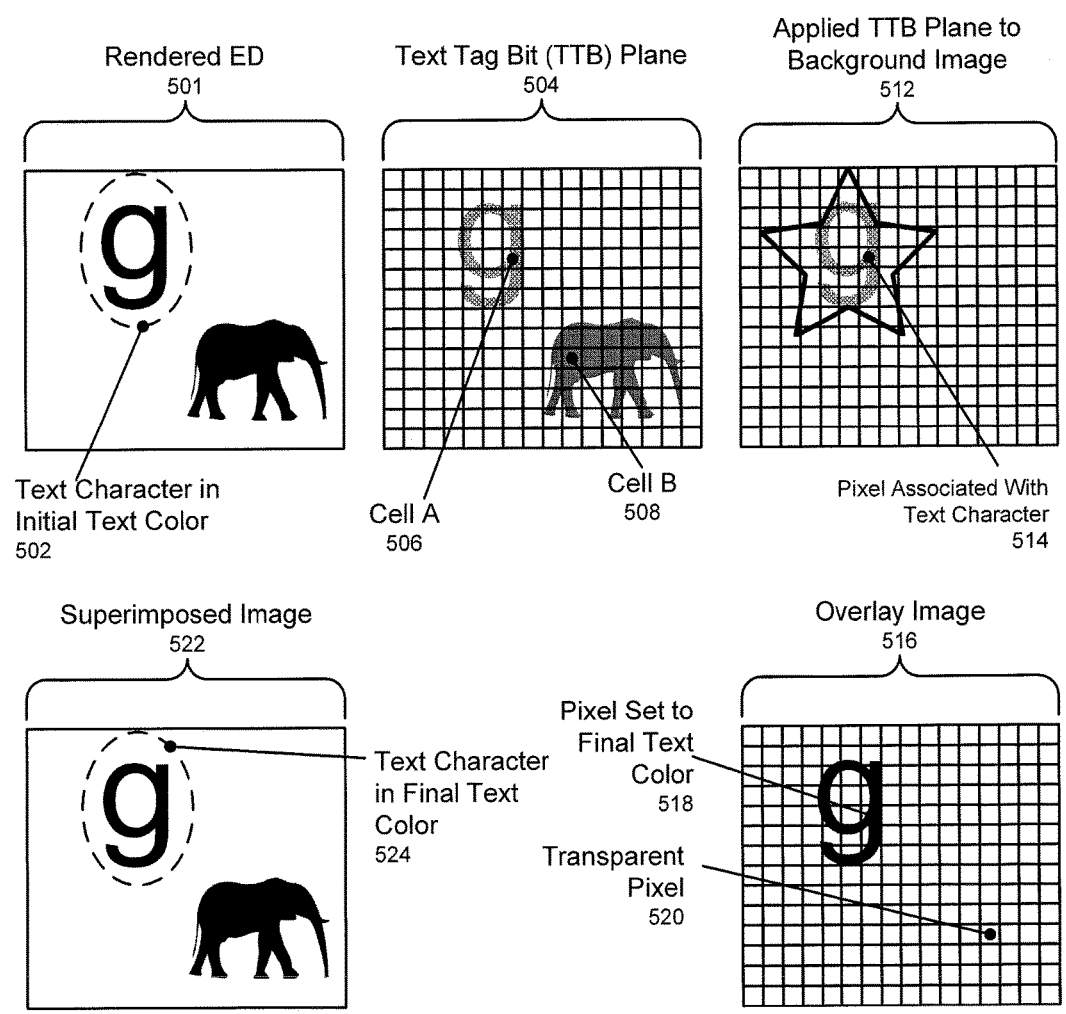

FIG. 5 shows an example in accordance with one or more embodiments of the invention. As shown in FIG. 5, there exists a rendered ED (501). The rendered ED (501) includes a text character in an initial text color (502). There also exists a TTB plane (504) for the rendered ED (501). The TTV plane (504) is a grid with multiple cells (e.g., Cell A (506), Cell B (508)). Each cell corresponds to a pixel of the rendered ED (501). Cell A (506) corresponds to a pixel in the rendered ED (501) that forms the text character (502). Cell B (508) does not correspond to a pixel in the rendered ED (501) that forms a text character. Accordingly, Cell A (506) and Cell B (508) store different values.

Assume background image (510) is an image of the environment behind on the screen on which the ED will be displayed. By applying (512) the TTB plane (504) to the background image (510), is possible to identify pixels (514) of the background image that are associated with the text character (502). The overlay image (516) may be generated by making all pixels in the background image that are not associated with the text character transparent (520). The overlay image (516) is also generated by setting pixels in the background image associated with the text character to the final text color (518).

The superimposed image (522) may be generated by superimposing the overlay image (516) upon the rendered ED (501). As shown in FIG. 5, the graphics of the rendered ED (501) do not change. However, the text character is now displayed in the final text color (524), not the initial text color. The final text color (524) is easier to read because there is greater contrast between the final text color and the environment behind the screen on which the superimposed image (522) is displayed.

Embodiments of the invention have the following advantages: the ability to improve readability of text on a transparent or partially transparent screen; the ability to transition text color from an initial text color to a final text color over multiple stages; the ability to generate a superimposed image from the rendered ED and an overlay image; the ability to at least partially preserve differences between different initial text colors specified in the ED, etc.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for operating a device comprising a screen, comprising:
obtaining, by the device, a first background image of an environment behind the screen;
obtaining, by the device, an electronic document (ED) comprising a text character with an initial text color and a graphic;
generating a rendered version of the ED comprising a first plurality of pixels corresponding to the text character and a second plurality of pixels corresponding to the graphic;
generating, from the rendered version of the ED, a text tag bit (TTB) plane comprising a first plurality of cells corresponding to the first plurality of pixels and a second plurality of cells corresponding to the second plurality of pixels,
wherein each of the first plurality of cells stores a first value in response to the cell corresponding to the text character, and wherein each of the second plurality of cells stores a second value in response to the cell corresponding to the graphic;
identifying, by applying the TTB plane to the first background image, at least:
a first plurality of pixels in the first background image corresponding to the text character; and
a second plurality of pixels in the first background image corresponding to the graphic,
wherein the first plurality of pixels in the first background image intersect with the first plurality of cells in the TTB, and
wherein the second plurality of pixels in the first background image intersect with the second plurality of cells in the TTB;
determining, by the device, a first final text color based on the initial text color and the first plurality of pixels in the first background image;
generating an overlay image by:
setting the first plurality of pixels in the first background image to the first final text color, wherein the first plurality of pixels set to the first final text color forms the text character and are opaque; and
setting the second plurality of pixels in the first background image to transparent; and
simultaneously displaying, by the device and on the screen, the overlay image and the rendered version of the ED,
wherein the overlay image and the rendered version of the ED are different layers and the overlay image is overlaid on top of the rendered version of the ED,
wherein the graphic in the rendered version of the ED is visible through the second plurality of pixels in the overlay image that are transparent,
wherein the text character in the overlay image is opaque and covers the same text character in the rendered version of the ED, and
wherein in a final presentation to a user, the environment behind the screen is overlaid with the rendered version of the ED overlaid with the overlay image.

2. The method of claim 1, wherein the device is a pair of glasses, wherein the screen is located in a lens of the pair of glasses, and wherein the first background image is generated by a camera attached to the pair of glasses.

3. The method of claim 1, wherein determining the first final text color comprises:
calculating a greyscale value based on the first plurality of pixels in the first background image;
calculating a color scale based on the greyscale value; and
multiplying the color scale with a red component, a green component, and a blue component of the initial text color.

4. The method of claim 1, further comprising:
determining a change in the environment behind the screen;
obtaining, by the device, a second background image of the environment behind the screen;
identifying, by the device, a pixel in the second background image associated with the text character;
calculating, by the device, a second final text color based on the initial text color and the pixel in the second background image; and
transitioning, by the device and while the ED is displayed, the text character from the first final text color to the second final text color over a plurality of stages.

5. A non-transitory computer readable medium (CRM) storing instructions for operating a device comprising a screen, the instructions comprising functionality for:
obtaining a first background image of an environment behind the screen;
obtaining an electronic document (ED) comprising a text character with an initial text color and a graphic;
generating a rendered version of the ED comprising a first plurality of pixels corresponding to the text character and a second plurality of pixels corresponding to the graphic;
generating, from the rendered version of the ED, a text tag bit (TTB) plane comprising a first plurality of cells corresponding to the first plurality of pixels and a second plurality of cells corresponding to the second plurality of pixels,
wherein each of the first plurality of cells stores a first value in response to the cell corresponding to the text character, and wherein each of the second plurality of cells stores a second value in response to the cell corresponding to the graphic;
identifying, by applying the TTB plane to the first background image, at least:
a first plurality of pixels in the first background image corresponding to the text character; and
a second plurality of pixels in the first background image corresponding to the graphic,
wherein the first plurality of pixels in the first background image intersect with the first plurality of cells in the TTB, and
wherein the second plurality of pixels in the first background image intersect with the second plurality of cells in the TTB;
determining a first final text color based on the initial text color and the first plurality of pixels in the first background image;
generating an overlay image by:
setting the first plurality of pixels in the first background image to the first final text color, wherein the first plurality of pixels set to the first final text color forms the text character and are opaque; and
setting the second plurality of pixels in the first background image to transparent; and
simultaneously displaying, on the screen of the device, the overlay image and the rendered version of the ED, wherein the overlay image and the rendered version of the ED are different layers and the overlay image is overlaid on top of the rendered version of the ED, wherein the graphic in the rendered version of the ED is visible through the second plurality of pixels in the overlay image that are transparent, wherein the text character in the overlay image is opaque and covers the same text character in the rendered version of the ED, and wherein in a final presentation to a user, the environment behind the screen is overlaid with the rendered version of the ED overlaid with the overlay image.

6. The non-transitory CRM of claim 5, wherein the instructions for determining the first final text color comprise functionality for:

calculating a greyscale value based on the first plurality of pixels in the first background image;

calculating a color scale based on the greyscale value; and multiplying the color scale with a red component, a green component, and a blue component of the initial text color.

7. The non-transitory CRM of claim 5, the instructions further comprising functionality for:

determining a change in the environment behind the screen;

obtaining a second background image of the environment behind the screen;

identifying a pixel in the second background image associated with the text character;

calculating a second final text color based on the initial text color and the pixel in the second background image; and transitioning, while the ED is displayed, the text character from the first final text color to the second final text color over a plurality of stages.

8. The non-transitory CRM of claim 5, wherein the device is a pair of glasses, wherein the screen is located in a lens of the pair of glasses, and wherein the first background image is generated by a camera attached to the pair of glasses.

9. A device, comprising:

a screen;

a buffer storing an electronic document (ED) comprising a text character with an initial text color and a graphic;

a camera that generates a first background image of an environment behind the screen; and a computer processor that:

generates a rendered version of the ED comprising a first plurality of pixels corresponding to the text character and a second plurality of pixels corresponding to the graphic;

generates, from the rendered version of the ED, a text tag bit (TTB) plane comprising a first plurality of cells corresponding to the first plurality of pixels and a second plurality of cells corresponding to the second plurality of pixels, wherein each of the first plurality of cells stores a first value in response to the cell corresponding to the text character, and wherein each of the second plurality of cells stores a second value in response to the cell corresponding to the graphic;

identifies, by applying the TTB plane to the first background image, at least:

a first plurality of pixels in the first background image corresponding to the text character; and a second plurality of pixels in the first background image corresponding to the graphic, wherein the first plurality of pixels in the first background image intersect with the first plurality of cells, and wherein the second plurality of pixels in the first background image intersect with the second plurality of cells;

determines a first final text color for the text character based on the first plurality of pixels in the first background image and the initial text color; and generates an overlay image by:

setting the first plurality of pixels in the first background image to a first final text color, wherein the first plurality of pixels set to the first final text color forms the text character and are opaque; and setting the second plurality of pixels in the first background image to transparent, wherein the overlay image and the rendered version of the ED are simultaneously displayed on the screen to display the text character in the first final text color, wherein the overlay image and the rendered version of the ED are different layers and the overlay image is overlaid on top of the rendered version of the ED, wherein the text character in the overlay image is opaque and covers the same text character in the rendered version of the ED, wherein the graphic in the rendered version of the ED is visible through the second plurality of pixels in the overlay image that are transparent, and wherein in a final presentation to a user, the environment behind the screen is overlaid with the rendered version of the ED overlaid with the overlay image.

10. The device of claim 9, wherein the screen is located in a lens of a pair of glasses, and wherein the camera is attached to the pair of glasses.

11. The device of claim 9, wherein:

the camera also generates a second background image of the environment following a change in the environment;

the second background image comprises a pixel associated with the text character;

the computer processor also determines a second final text color for the text character based on the pixel and the initial text color; and the text character is transitioned from the first final text color to the second final text color while the ED is displayed on the screen.

12. The device of claim 9, wherein the computer processor also:

calculates a greyscale value based on the first plurality of pixels in the first background image;

calculates a color scale based on the greyscale value; and multiplies the color scale with a red component, a green component, and a blue component of the initial text color.

* * * * *